United States Patent [19]

Weid et al.

[11] Patent Number: 5,159,757

[45] Date of Patent: Nov. 3, 1992

[54] HAND SHEARS, PARTICULARLY BRANCH, HEDGE AND/OR GARDEN SHEARS

[75] Inventors: Helmut Weid, Niederdreisbach; Peter Held, Scheuerfeld, both of Fed. Rep. of Germany

[73] Assignee: Wolf-Gerate G.m.b.H. Vertriebsgesellschaft KG, Betzdorf, Fed. Rep. of Germany

[21] Appl. No.: 824,695

[22] Filed: Jan. 21, 1992

Related U.S. Application Data

[63] Continuation of Ser. No. 579,477, Sep. 10, 1990, abandoned.

[30] Foreign Application Priority Data

Sep. 8, 1989 [DE] Fed. Rep. of Germany ....... 3929891
May 10, 1990 [DE] Fed. Rep. of Germany ....... 4015021

[51] Int. Cl.$^5$ .................................................. B26B 13/26
[52] U.S. Cl. ........................................ 30/251; 30/249
[58] Field of Search ................ 30/251, 248, 249, 250, 30/190, 199, 177

[56] References Cited

U.S. PATENT DOCUMENTS

| 993,646 | 5/1911 | Burkett | 30/250 |
|---|---|---|---|
| 1,577,140 | 3/1926 | Mitchell | 30/250 |
| 2,384,822 | 9/1945 | Drmic | 30/250 |
| 2,520,905 | 9/1950 | Borrelli | 30/251 |
| 3,243,880 | 4/1966 | Weller | 30/250 |
| 3,273,240 | 9/1966 | Florian | 30/251 |
| 3,587,173 | 6/1971 | Hexdall | 30/251 |
| 3,839,794 | 10/1974 | Deale | 30/248 |
| 3,851,389 | 12/1974 | Swanson | 30/250 |
| 4,094,064 | 6/1978 | Nishikawa et al. | 30/251 |
| 4,176,450 | 12/1979 | Muromoto | 30/251 |
| 4,312,127 | 1/1982 | Tanaka | 30/250 |

FOREIGN PATENT DOCUMENTS

| 2508973 | 9/1976 | Fed. Rep. of Germany . | |
|---|---|---|---|
| 3808568 | 9/1989 | Fed. Rep. of Germany | 30/249 |
| 601072 | 4/1948 | United Kingdom | 30/250 |

Primary Examiner—Frank T. Yost
Assistant Examiner—Hwei-Siu Payer
Attorney, Agent, or Firm—Anderson Kill Olick & Oshinsky

[57] ABSTRACT

Hand shears (1), particularly those which can be used as branch, hedge and/or garden shears, comprise two shearing blades (2, 3) which can be tilted toward or away from one another by two hand levers (4 and 5) about a common joint (6). The hand levers (4 and 5) are joined to one another directly independently of the shearing blades (2 and 3) by means of a second joint (8) which is offset parallel to the shearing blades joint (6). The shearing blade (2) is rigidly connected with a hand lever (4), while the other shearing blade (3) has a driving arm (9), which protrudes beyond the shearing blade joint (6) and to which one end of a coupler (10) is hinged at the linking axis (11). By way of its other end, the coupler (10) is attached also through a linking axis (12) to the second hand lever (5). The two hand levers (4 and 5) and the two shearing blades (2 and 3) together form a four-joint system. For the purpose of setting a variable force transmission, at least the distance between the linking axis (12) of the coupler (10) on the second hand lever (5) and the joint (8) directly connecting the two hand levers (4 and 5) is variable.

14 Claims, 7 Drawing Sheets

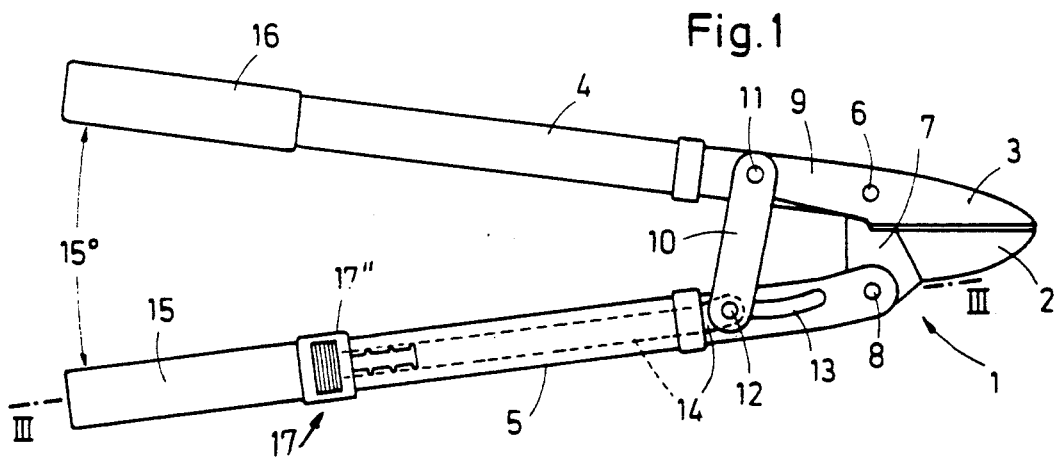
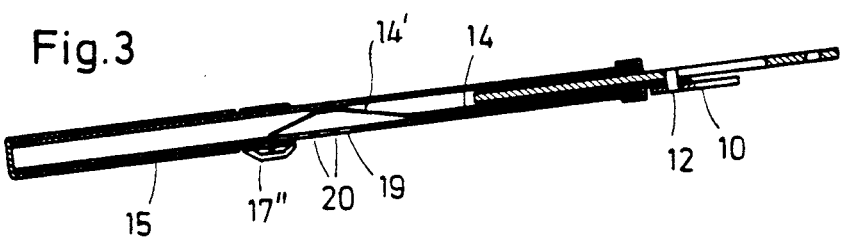
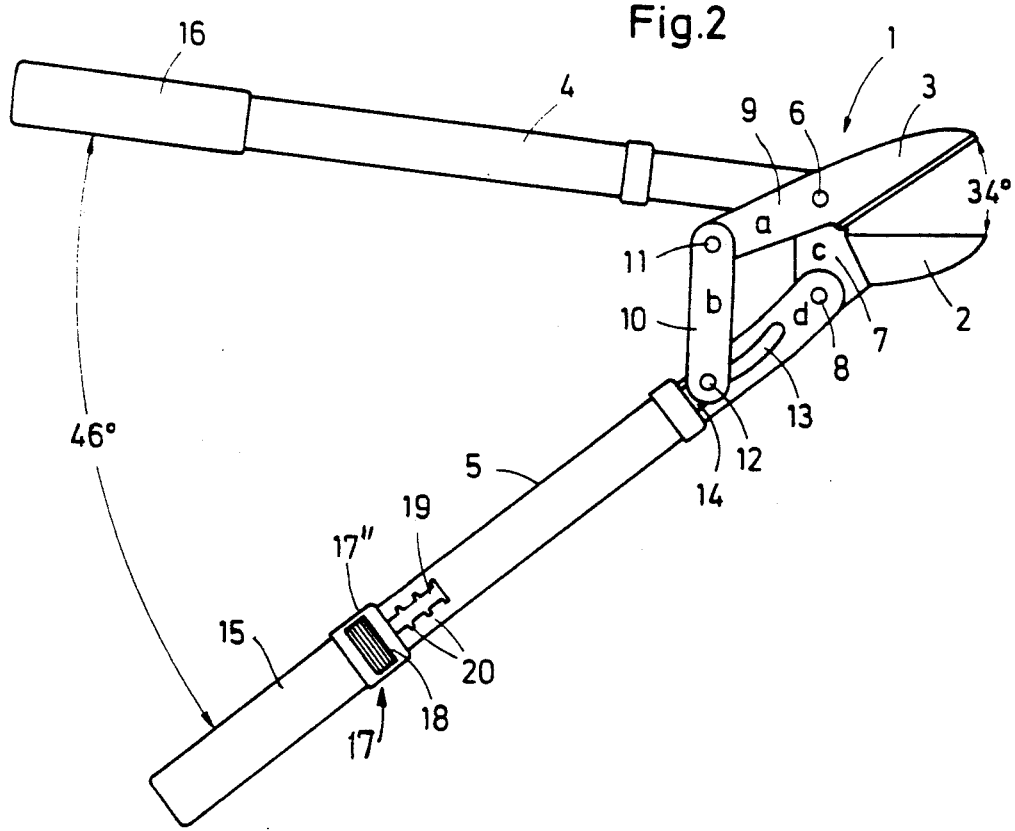

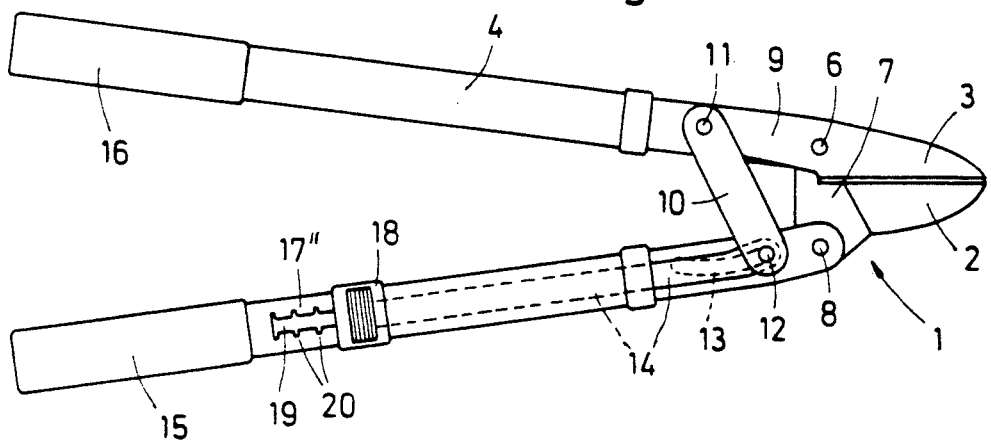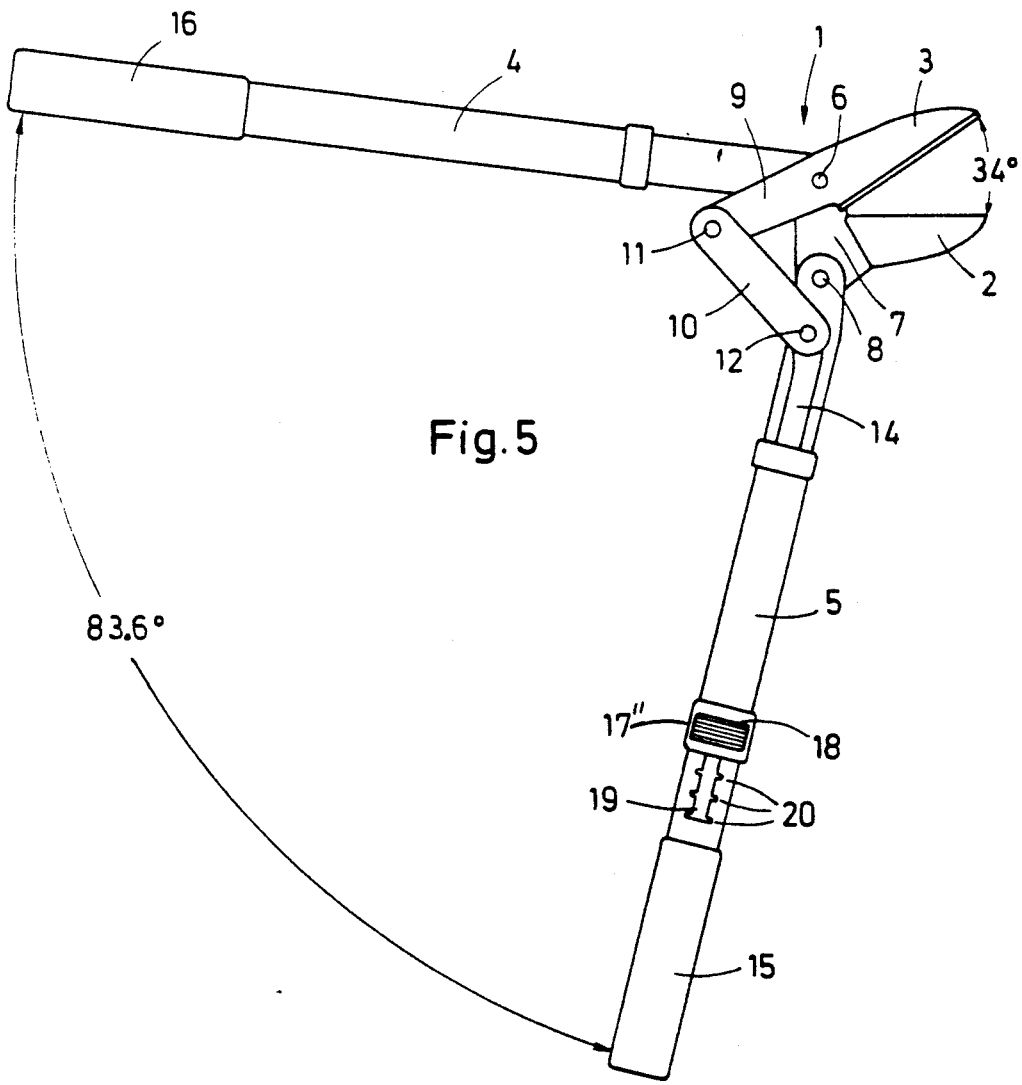

HAND SHEARS, PARTICULARLY BRANCH, HEDGE AND/OR GARDEN SHEARS

This is a continuation of application Ser. No. 97/579,477 filed Sep. 10, 1990, abandoned.

FIELD OF INVENTION

This invention relates to hand shears and, more particularly, to branch, hedge and/or garden shears with two cutting elements, which can be tilted toward and away from one another by two hand levers about a common joint.

BACKGROUND OF THE INVENTION

In such types of shears, the hand levers are joined to one another directly, independently of the cutting or shearing elements, by means of a second joint which is offset parallel to the cutting element joint and in which one of the cutting elements is connected rigidly with one of the two hand levers, while the other shearing blade has a driving arm which protrudes beyond the shearing blade joint and to which one end of a coupler is hinged. The other end of the coupler, also freely movable, is fastened to the second hand lever, the two hand levers and the two cutting elements forming a four-joint system with one another.

"Cutting elements" are understood to be, in a first type of shears, two shearing blades which work against one another and, in a second type of shears, an anvil and a cutting edge working against this anvil.

Hand shears of the first named type are already known and, compared to shears constructed according to a one joint system, have the considerable advantage that they make power transmission possible, which depends not only on the ratio of the length of the arms of the cutting elements on the one hand and of the hand levers carrying these cutting elements on the other, but is also determined significantly by the length ratio of the individual elements of the four-joint system.

Appreciable cutting forces can readily be achieved by applying relatively small forces by hand to the operating handles of the two hand levers.

However, German Offenlegungsschrift 25 08 973 also discloses hand shears of the same type of construction, in which, with little additional technical effort for different applications or uses, optimization in each case of the power transmission between the hand levers and the cutting elements can be achieved.

Such a change in the power transmission is desirable, for example, when the hand shears are used to cut materials, the cross-sectional dimensions of which differ significantly from case to case.

This advantage is achieved in the known device owing to the fact that at least the distance between the linking axis of the coupler on the second hand lever and the joint directly linking the two hand levers is variable.

By carrying out adjusting measures at a single place of the four-joint system, the available adjustment path for the two hand levers can be varied without there being any change in the available regulating distance between the two shearing blades.

The changing of the power transmission in the known hand shears is however awkward and time consuming because, for this purpose, it is always necessary to loosen the hinge pin for the coupler from one borehole and subsequently to transfer it into the other borehole. At the same time, it is essential to secure the pin in its working position against inadvertent loosening, otherwise it can be lost and/or the hand shears are unable to function.

OBJECT OF THE INVENTION

It is therefore an object of the present invention to provide hand shears which can be adjusted to different power transmissions in a simple manner, permanently, and so that they are sure to function.

SUMMARY OF THE INVENTION

In accordance with one feature of the invention, this object is achieved by a novel construction in which the linking axis of the coupler at the second hand lever is controlled so that it can be shifted transversely to the direction of its axis and locked. Beyond the design and functional characteristics of this feature, it is, of course, also within the scope of the invention to make distance changes possible within the four-joint system at other joint sites and to affect the power transmission by these means. For example, the shears can be constructed so that the distance of the axis which links the coupler with the protruding driving arm of the second cutting element from the cutting elements joint on the one hand, and from the linking axis of the coupler on the second hand lever on the other, is variable, without causing a change in the constructional and functional principles of the hand shears.

Moreover, in accordance with a second feature, the linking axis of the coupler engages a slot guide on the second hand lever and is adjustably supported along this slot guide by means of a slide. This has proven to be of importance.

Pursuant to the invention, designing the hand shears to favor its operation is achieved in accordance with a third feature in that the slide is taken to one end of the second hand lever having or forming an operating handle and is coupled there with an adjusting or locking device abutting the hand lever.

In this case, adjustment can be made easily from the handle and the user's hand need not leave its normal position.

Pursuant to a fourth feature of the invention, the second hand lever consists at least along a part of its length of a tube or a hollow profile, which tube conceals and accommodates the greater portion of the length of the slide.

A continuously variable adjustment of the power transmission can be achieved pursuant to a fifth feature of the invention when the adjusting and locking device comprises two mutually engaging threaded couplings, one of which engages the slide, while the other has its abutment on the second hand lever. In this connection, it proves to be advantageous according to a sixth feature when the one threaded coupling engages the slide so that it cannot rotate, while the other threaded coupling is held at the hand lever so that it can rotate, but cannot be shifted axially. Pursuant to a seventh feature of the invention, the threaded element, which can rotate, can be supported so that it can rotate but cannot be displaced either at the free end of the hand lever or in cutouts of the hand lever, which cutouts are disposed some distance from the free end.

If an infinitely variable change in the power transmission within given limits is sufficient, the adjusting and locking device, in accordance with an eighth feature of the invention, can be formed by an arresting element which engages the slide and interacts with an arresting link that extends in the longitudinal direction of the hand lever and contains a plurality of arresting catches for the arresting element, which catches are disposed some distance apart one behind the other.

In this case, the arresting element, in accordance with a ninth feature of the invention, can be designed as a push-button actuator which is acted upon in the engaged position by the force of a spring and can be actuated, for example, by the user's thumb alone of the hand holding the operating handle, the push-button actuator in each case automatically engaging the next arresting catch.

In accordance with a tenth feature of the invention, a slot guide is provided with take-up or arresting depressions for the linking axis of the coupler, which depressions are located in the slotted edge adjacent the outside of the hand lever. It is thus possible to achieve in a simple manner that the coupling force is intercepted directly in the longitudinal section of the second hand lever in which the slot guide is located. As a consequence of this, the slide which engages the movable linking axis of the coupler, and the elements of the adjusting and locking device assigned to this slide, remain free of forces.

Pursuant to an eleventh feature of the invention, the arresting depressions are located in an approximately mutually equidistant arrangement in the two slotted edges, so that the linking axis of the coupler, which interacts with the slot guide, has constant guidance play practically everywhere along the slot guide.

In a preferred embodiment of the hand shears in accordance with the invention, an arresting depression is disposed at both ends of the slot and a further arresting depression is disposed about halfway along the slot. In this way, three different transmission ratios can be set for the hand shears. If necessary, other intermediate positions can also be set with the adjusting and locking device.

For the practical use of the inventive hand shears, if it is sufficient to work with the transmission ratios that can be set by the take-up or arresting depressions, then the manually operated setting and locking device can optionally be omitted and automatic adjustment for the transmission ratio can be provided. This can be achieved pursuant to still another feature of the invention by providing a spring element that engages the coupler, the linking axis of which engages the slot guide on the second hand lever, with a direction of spring action which is directed away from the joint directly connecting the two hand levers, and that the opening angle between the two shearing blades is limited by a stationary stop on the hand lever.

If, at the same time, the spring element, in accordance with a further feature, consists of a tension spring, one end of which engages the coupler while the other end is anchored on the second hand lever, adjustment of the different transmission ratios can be brought about automatically by swinging the hand levers apart by differing amounts.

This procedure can be fostered further, in accordance with another feature, when the point of attack of the spring, particularly a tension spring, on the coupler is at a greater distance from the linking axis engaging the slot guide than from the other linking axis.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

SUMMARY OF THE DRAWINGS

In the drawings:

FIG. 1 is a side view of one form of hand shears with two shear blades in accordance with the invention. The two shear blades are shown swivelled against one another in the closed position. The power transmission is at the smallest possible setting;

FIG. 2 shows the hand shears of FIG. 1 with the shear blades moved apart in the open position;

FIG. 3 is a section along line III—III of FIG. 1;

FIG. 4 is a view of the hand shears in a representation corresponding to that of FIG. 1, but with the power transmission at the largest possible setting;

FIG. 5 shows the hand shears of FIG. 4 with the shear blades moved apart in the open position;

DETAILED DESCRIPTION OF THE PREFERRED EMBODIMENTS

Figure 1A:
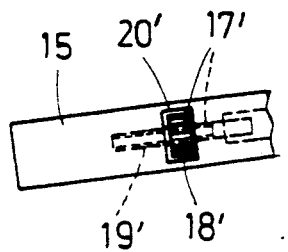
FIGS. 1a and 2a illustrate, respectively, two modified power adjustment means for the shears of FIG. 1.
Figure 2A:
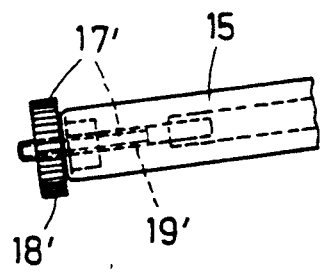

The hand shears 1, shown in FIGS. 1–5 of the drawings, can be used in a particularly advantageous manner as branch, hedge and/or garden shears. As its main functioning parts, the hand shears 1 have two shearing blades 2 and 3 and two hand levers 4 and 5.

An important characteristic of the hand shears 1 is that the two shearing blades 2 and 3, between their closed position shown in FIGS. 1 and 4 and their open position shown in FIGS. 2 and 5, can be shifted over a constant opening angle of, for example, 34°, and, moreover, independently of whether the two hand levers 4 and 5, which serve to actuate the shears, can be moved over a relatively small angle with respect to one another—see FIGS. 1 and 2—or over a relatively large angle—see FIGS. 4 and 5.

In other words, the tiltable shearing blades 2 and 3 pass through the same angle when the hand shears 1 are operated at a relatively small power transmission (see FIGS. 1 and 2) or when they are operated at a relatively large power transmission (see FIGS. 4 and 5).

It is evident from the drawings that the two shearing blades 2 and 3 are pivotably connected to one another through a common joint 6. The shearing blade 2 is rigidly connected to the hand lever 4 by way of a sideways directed bracket 7 which can be seen clearly in FIGS. 1 and 2, as well as in FIGS. 4 and 5, and which itself can be constructed as or made integral with the lower shearing blade 2. This bracket 7 carries a further joint 8 displaced parallel to the shearing blade joint 6 and over which the two hand levers 4 and 5 are connected directly with one another independently of the shearing blades 2 and 3.

Instead of the two shearing blades 2 and 3, the shears can also have two different cutting elements, for example, an anvil and a cutting edge working against this anvil. The anvil forming the lower cutting element can be screwed laterally to the bracket 7.

The working linkage of the shearing blade 3 with the second hand lever 5 is brought about in that the shearing blade 3 has a driving arm 9 protruding or extending beyond the shearing blade joint 6 and is engaged freely movably by one end of a coupler element 10 over a linking axis 11. On the other hand, this coupler is connected also freely movably over a further linking axis 12 to the second hand lever 5. All joints 6 and 8, as well as linking axes 11 and 12, extend in the same direction, that is, parallel to one another and at right angles to the pivoting plane of the shearing blades 2 and 3 as well as of the hand levers 4 and 5. The mechanism elements which are connected over the joints 6 and 8, as well as the linking axes 11 and 12, form a four-joint linkage system with one another with the mechanism elements a, b, c and d (FIG. 2). The mechanism element a is the driving arm 9 for the shearing blade 3, the mechanism element b is formed by the coupler 10, while the mechanism element c is the bracket 7 with shearing blade 2 of the first hand lever 4. Finally, the longitudinal section of the second hand lever 5, between the joint 8 and the linking axis 12, functions as the mechanism element d.

It can be seen from FIGS. 1 and 2, as well as FIGS. 4 and 5 that, for the operation of the hand shear 1 shown in the drawings, mechanism elements a, b and c of the four-joint system have a constant, that is, unvarying, working length. On the other hand, it can be inferred from these drawings that the working length of the mechanism element d in the four-joint system is variable within given limits. The mechanism element d has the largest working length for the setting shown in FIGS. 1 and 2. On the other hand, FIGS. 4 and 5 of the drawings show the setting at which the mechanism element d has its smallest working length.

Due to the change in the working length of the mechanism element d, the power transmission ratio of the hand levers 4 and 5 on the shearing blades 2 and 3 can be varied with the help of the four-joint system. With the setting of FIGS. 1 and 2, that is, with the longest working length of the mechanism element d, the hand shears 1 are set for their smallest possible power transmission ratio. On the other hand, with the smallest possible setting of the mechanism element d of FIGS. 4 and 5, the hand shears 1 have the largest possible power transmission ratio. The different power transmission ratios are characterized by the fact that, when the power transmission ratio is small, the hand levers 4 and 5 are movable relative to one another also only over a comparatively small pivoting angle (46°–15°) as shown in FIGS. 1 and 2. On the other hand, the two hand levers 4 and 5 are shifted over a large pivoting angle (83.6°–15°) relative to one another at the large power transmission ratio setting as shown in FIGS. 4 and 5.

It should still be mentioned here that, for the setting of the hand shears 1 shown in FIGS. 1 and 2, the mechanism element c in the four-joint system has the shortest working length while, at the same time, the mechanism element d has the longest working length.

In contrast to this, it follows that, for the setting of the hand shears 2 shown in FIGS. 4 and 5, the mechanism element b has the longest working length in the four-joint system, while the mechanism element d has the shortest working length in the four-joint system there.

It should be mentioned here that, if necessary, it is also easily possible to configure the length of the mechanism element a and/or of the mechanism element b variably in the hand shear 1 in order to make possible by these means a further variation in the power transmission and/or to affect the pivoting angle region between the two shearing blades 2 and 3. For this purpose, it would, for example, be possible to equip the driving arm 9 and/or the coupler 10 with a row of holes in the longitudinal direction and, at the same time, to configure the linking axis 11 in such a manner that, if necessary, it can be moved from one hole to another in this row by simple manipulations.

The linking axis 12 for coupler 10 on the hand lever 5 engages the latter in a slot guide 13. This runs on the arc of a circle about the linking axis 11 with a radius equal to the length of the mechanism element b (coupler 10). By these means, it is possible to change the transmission with the shears closed, without changing the position of the hand levers 4, 5. For this purpose, a slide 14 is in constant connection with the linking axis 12. Over the greater part of its length, this slide 14 protrudes into the hand lever 5, which is constructed at least partially as a tube or with a hollow profile, as can be seen clearly in FIG. 3 of the drawings.

The slide 14 extends into the region of an operating handle 15 formed by the rear end of the hand lever 5 or mounted on it. There is, of course, also a corresponding operating handle 16 on the free end of the hand lever 4 of the hand shears 1.

An adjusting and locking device 17, which, in turn, interacts with the hand lever 5, is coupled to the slide 14.

If it is important to bring about an infinitely variable or small-step change in the length of the mechanism element d in the four-joint system, then as shown in FIG. 1a it is advisable to use, as adjusting and locking device 17, two meshing threaded couplings, one of which then engages the slide 14, while the other has its abutment at the hand lever 5. It is for example possible to provide the threaded coupling, which does not rotate, on the slide 14, while the threaded coupling assigned to the hand lever 5 can rotate but is held axially immovable. In the simplest case, shown in FIG. 2a the threaded coupling that can rotate is disposed at the free end of the hand lever 5, that is, behind the operating handle 15. Of course, it is also possible to construct the handle itself so that it can rotate; in this case, the handle can then be locked after the adjustment.

If, however, the hand lever 5, which is formed by a tubular or hollow profile, has a cross-sectional shape, which is fashioned wider than it is high, that is, oval (elliptical) or rectangular, then the threaded element, which can rotate, can also be spaced at a distance from the operating handle 15 and be accommodated in the cutout of the hand lever 5 in such a manner that it protrudes from the broad sides of the hand lever profile in segment fashion for manipulation.

For the operation of the hand shears 1 shown in the drawing, the adjusting and locking device is, however, formed by an arresting element 18 which engages the slide 14 and interacts with an arresting link 19 that extends in the longitudinal direction of the hand lever 5. This arresting link 19 is equipped with a plurality of arresting catches 20 disposed some distance apart one behind the other and which can be engaged non-positively or positively by the arresting element 18.

The arresting element 18 is preferably on a push-button actuator 17" which is mounted on a spring element 14' carried by the slide 14. The spring element 14' is fashioned so that it tends to keep engaged the arresting element 18 with the arresting catches 20 of the arresting link 19. By the pressure of the thumb on the push-button actuator 17", the arresting element 18 can be disengaged from the arresting catches 20 of the arresting link 19 against the restoring force of the spring element 14' and, at the same time, the slide can be shifted in one or the other direction for the purpose of changing the length of element d. After the push-button actuator is released, the arresting element 18, once again under the restoring force of the spring element 14', engages the next arresting catch 20 of the arresting link 19 so that the corresponding adjustment of the four-joint system is fixed.

Figures 6, 7:
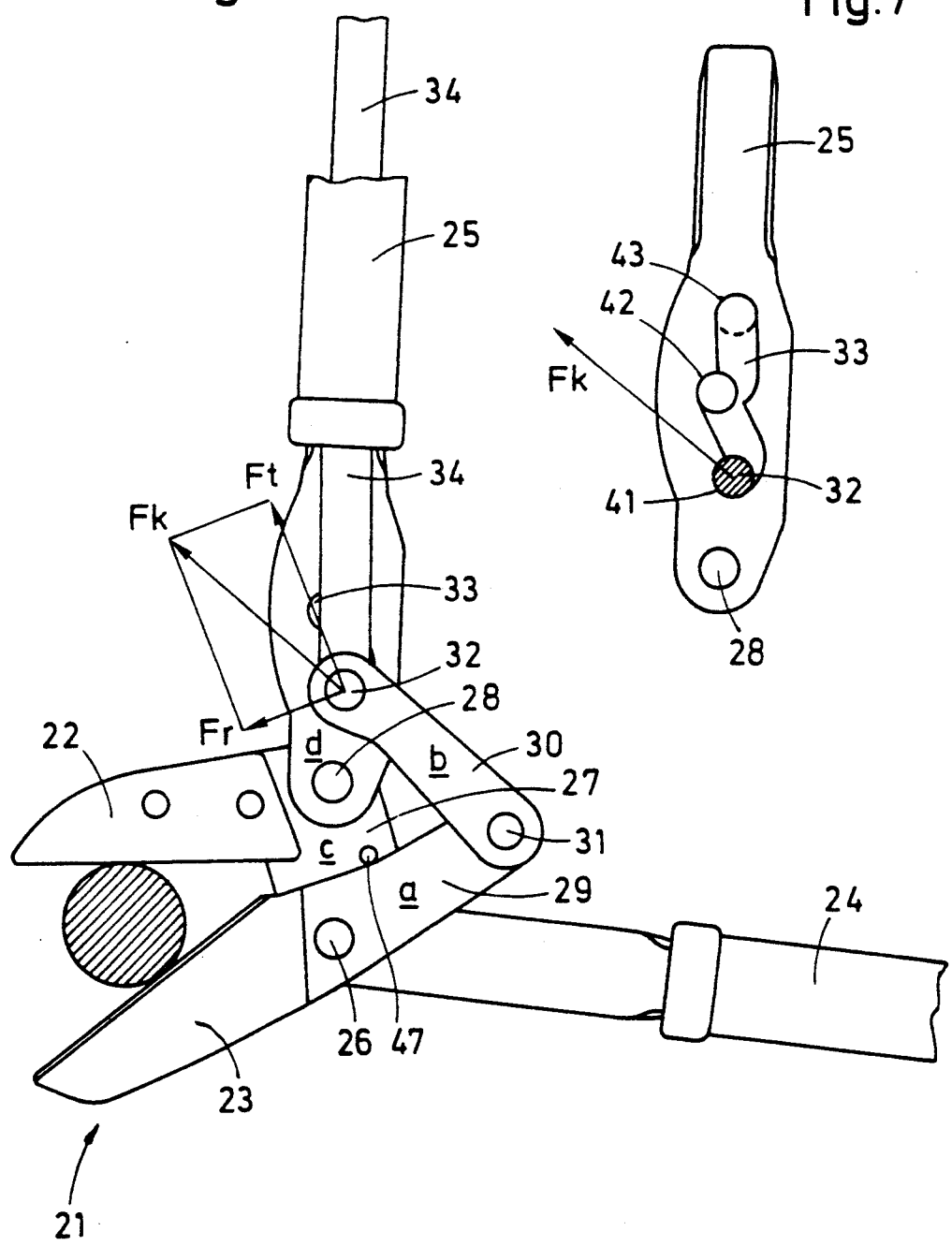
FIG. 6 is a side view on an enlarged scale of part of a modified form of the hand shears in accordance with the invention shown in position ready to cut an object.
FIG. 7 is a detailed view of the modification of the hand shears of FIG. 6.

Basically, the hand shears 21, shown in FIG. 6 of the drawings, have the same design as the hand shears 1 in FIGS. 1 to 5. They thus have two shearing blades 22 and 23, as well as two hand levers 24 and 25.

Here, also, the two shearing blades 22 and 23 have a common joint 26 and the two hand levers 24 and 25 are constantly connected to one another through a further joint 28. The shearing blade 23 has a driving arm 29 which protrudes beyond the joint 26 and with which a coupler 30 is constantly connected over a linking axis 31. On the other hand, the coupler 30 has a linking axis 32 with which it is guided in a slot guide 33 on the hand lever 25.

The shearing blade 22 is rigidly connected with the hand lever 24 over a sideways directed bracket 27. This bracket 27 also carries the joint 28 for the hand lever 25. The linking axis 32 of the coupler 30 can be shifted within the slot guide 33 with the help of a slide within certain limits which are determined by the length of the slot guide 33.

The special feature of the hand shears 21, shown in FIG. 6, compared to the hand shears of FIGS. 1 to 5, lies in a detail which can be seen clearly in FIG. 7 of the drawings. It can be seen there that the slot guide 33 is provided with several take-up or arresting depressions 41, 42, 43 for the linking axis 32 of the coupler 30. In this connection, it is advantageous if the slot guide 33 with its arresting depressions 41, 42 and 43, has an equidistant configuration or width over the whole of its length, so that the linking axis 32 can be held and guided at each site within the slot guide 33 with constant functional play.

The two arresting depressions 41 and 43 are provided at opposite ends of the slot guide, while the third arresting depression 42 is located approximately halfway along the slot guide 33. On cutting with the hand shears 21, the coupler 30 forming the mechanism element b in the four-joint system a, b, c, d, generates a coupling force Fk in the direction of its longitudinal axis, as is evident from the parallelogram of forces indicated in FIG. 6. This coupling force Fk can be divided into a tangential component Ft and a radial component Fr. The tangential component Ft acts as a compressive force on the slide 34, which normally must be taken up by the adjusting and locking device (see adjusting and locking device 17 in FIGS. 1 to 5) which interacts with the slide 34.

According to FIG. 7 of the drawings, however, the take-up and arresting depressions 41, 42, 43 in the slot guide 33 are provided so that coupling force Fk is reliably absorbed by them, because the linking axis 32 of the coupler 30 obtains a reliable supporting construction therein. With this, the coupling force Fk is completely absorbed in the mechanism element d of the four-joint system, that is, the adjusting and locking device is relieved of this load.

For the purpose of changing the transmission ratio of the hand shears, it is necessary merely to move the two hand levers 24 and 25 in the opening direction in such a manner that linking axis 32 is released from the respective take-up or arresting depression 41, 42, 43, so that it can then be displaced by way of the slide 34.

The modified hand shears 21 shown in FIGS. 8 to 13 basically have the same construction as the hand shears 21 of FIGS. 6 and 7. The only difference is that the slide 34, as well as a setting and locking device on the hand lever 25 that interacts with the slide 34, have been omitted.

Instead of these, a spring element 44, in particular, a tension spring, is incorporated between the coupler 30 and the hand lever 25. This tension spring 44 is anchored, on the one hand at 45 on the hand lever 25 and engages the coupler 30 at 46 in the region between the two linking axes 31 and 32.

The point of attack 46 of the tension spring 44 at the coupler 30 lies outside of the straight line connecting the two linking axes 31 and 32 and is, moreover, closer to the linking axis 31 than to the linking axis 32.

Moreover, on the bracket 27 between the shearing blade 22 and the hand lever 24, there is a stationary stop 47, with which the driving arm 29 of the shearing blade 23 can enter into effective connection in order to limit the maximum opening angle between the two shearing blades 22 and 23. (See FIG. 9.)

The hand shears 21 of FIGS. 8 to 13 offer the possibility of a, so to speak, automatic adjustment of the transmission ratio between the two hand levers 24 and 25 and the two shearing blades 22 and 23.

Figure 9:
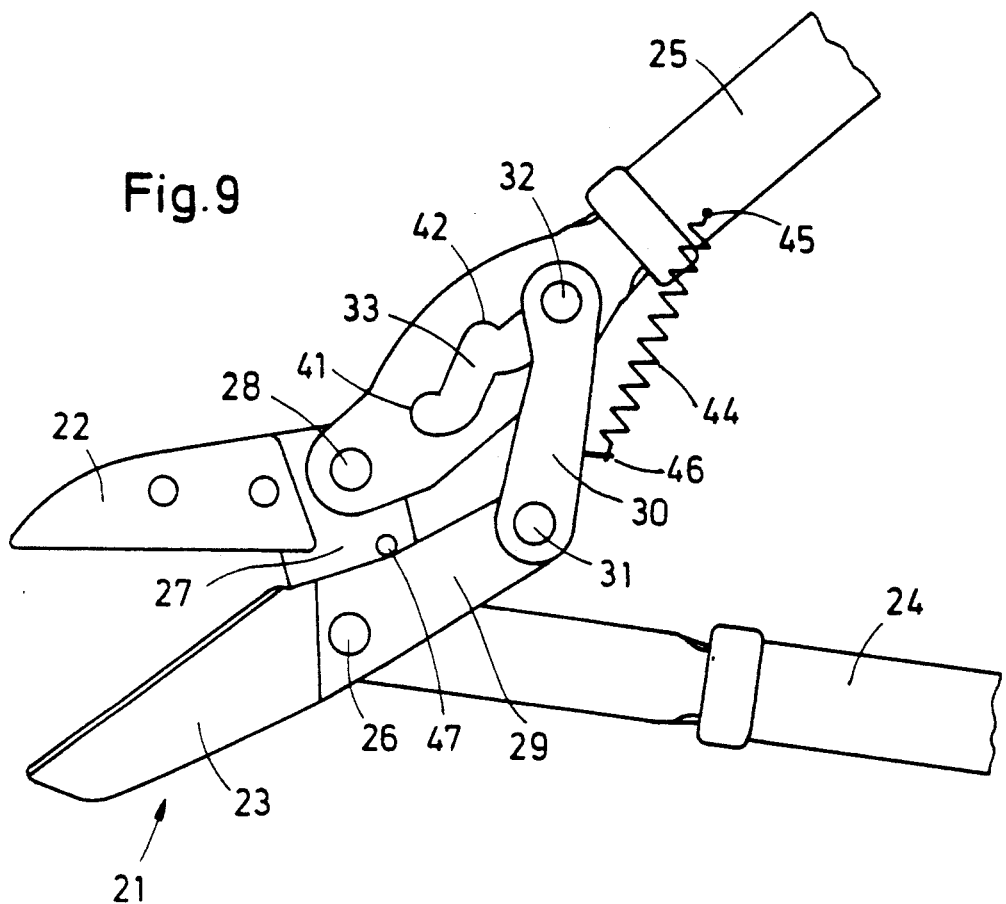
FIGS. 8 to 13 are side views of another modification of the hand shears of the invention in six different functional positions.
Figure 8:
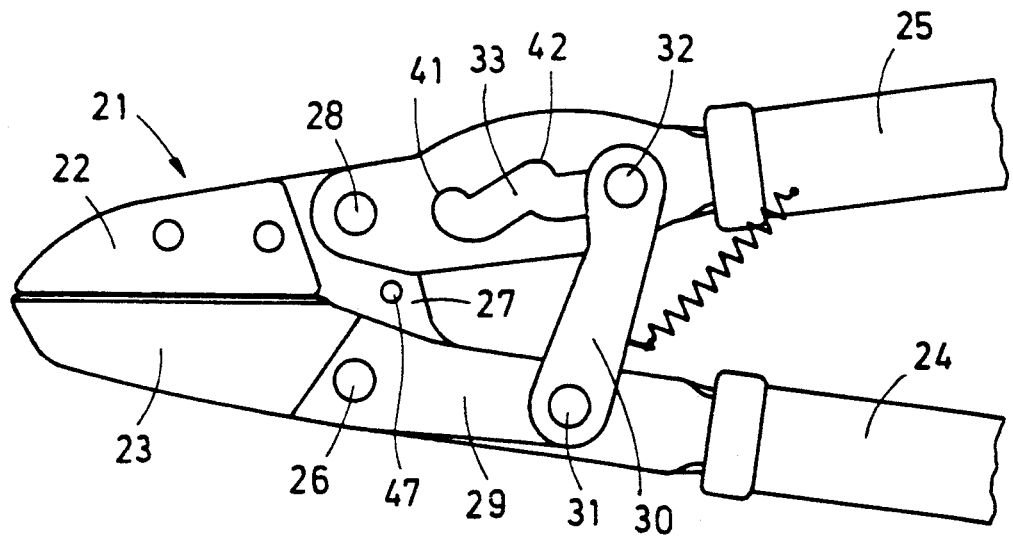

On the assumption that the hand shears 21 are adjusted basically for the smallest transmission ratio, then, in the closed state shown in FIG. 8, the coupler 30, under the action of the tension spring 44, is in a position in which its linking axis 32 is in the take-up or arresting depression 43. If now the shearing blades 22 and 23 are brought into the largest possible open position relative to one another, as shown in FIG. 9, then the driving arm 29 of the shearing blade 23 comes up against the stop 47. The hand lever 25 can, however, be moved further beyond the position of FIG. 9, for example, to as far as the position of FIG. 10. By these means, the linking axis 32 of the coupler 30 is unlatched from the take-up or arresting depression 43 and slides as far as the region of the take-up and arresting depression 42 of the slot guide 33, as can be seen in FIGS. 10 and 11.

Figure 11:
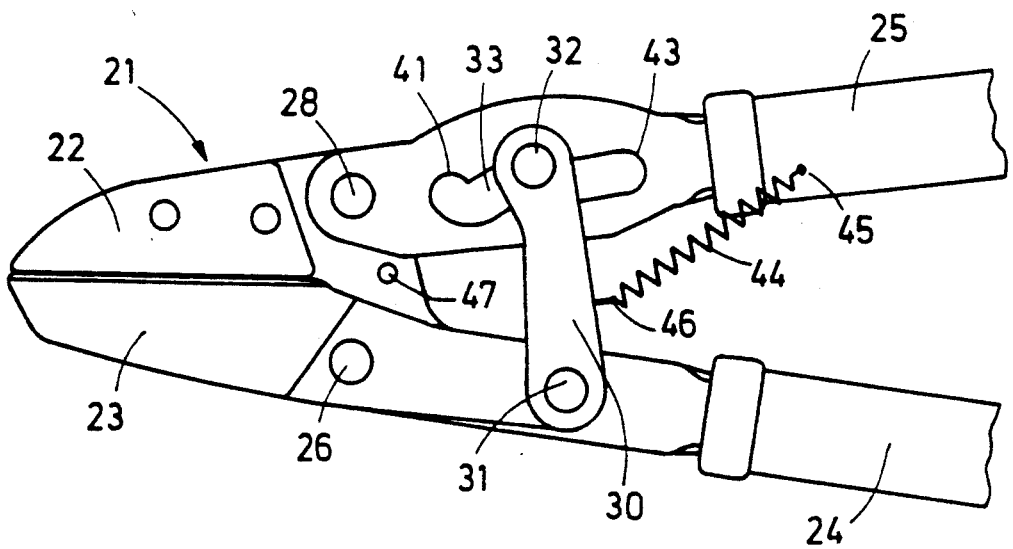

After carrying out a cutting operation, if the hand shears are opened slightly from their closed position corresponding to FIG. 11, by moving the two hand levers 24 and 25 apart, the linking pin 32 of the coupler 30 moves out of the take-up or arresting depression 42 and, under the action of the tension spring 44, jumps back into the take-up or arresting depression 43 so that the position of FIG. 8 again results.

Figure 12:
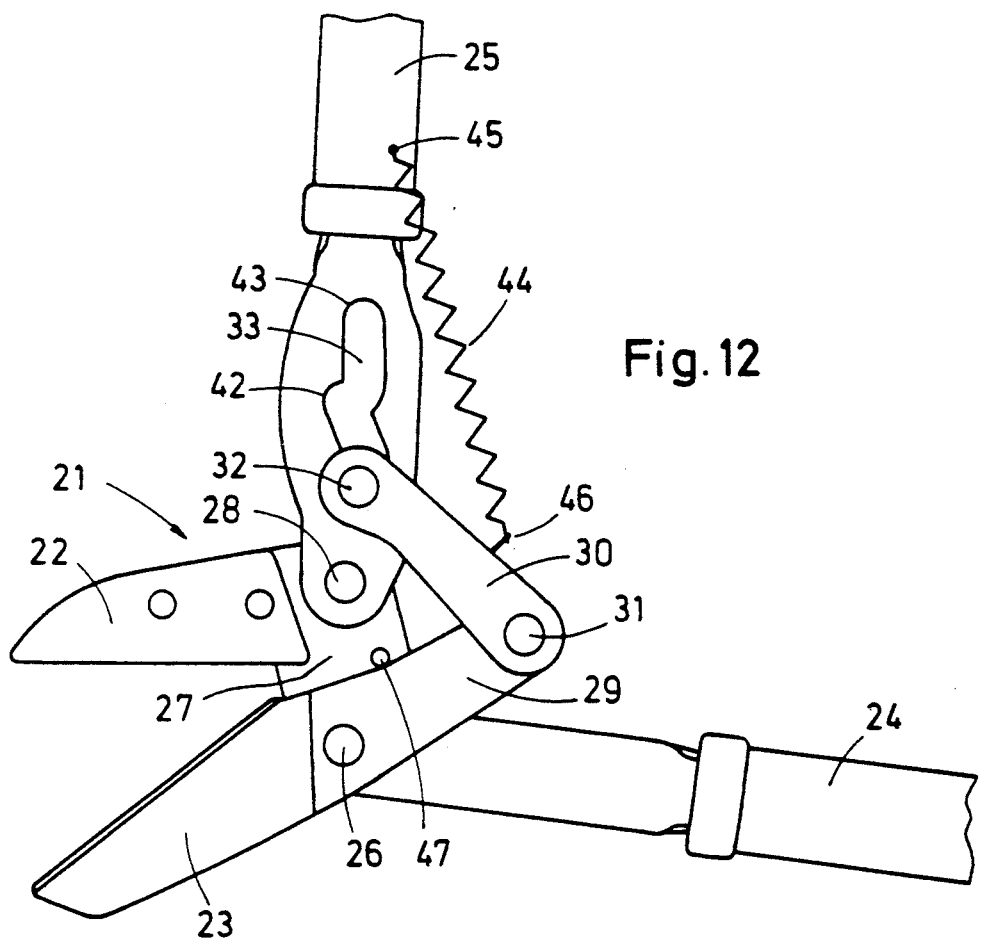

For the purpose of setting the largest possible transmission ratio for the hand shears 21, the two hand levers 24 and 25 must be moved apart as far as the angular position corresponding to FIG. 12. As a result, the coupler 30 falls with its linking axis 32 into the take-up or arresting depression 41 and is fixed automatically in spite of the largest possible initial tension of the tension spring 44. This is attributable to the fact that the attachment sites 45 and 46 of the tension spring 44 and the linking axis 31 between the coupler 30 and the driving arm 29 of the shearing blade 23 lie on a straight line.

Figure 10:
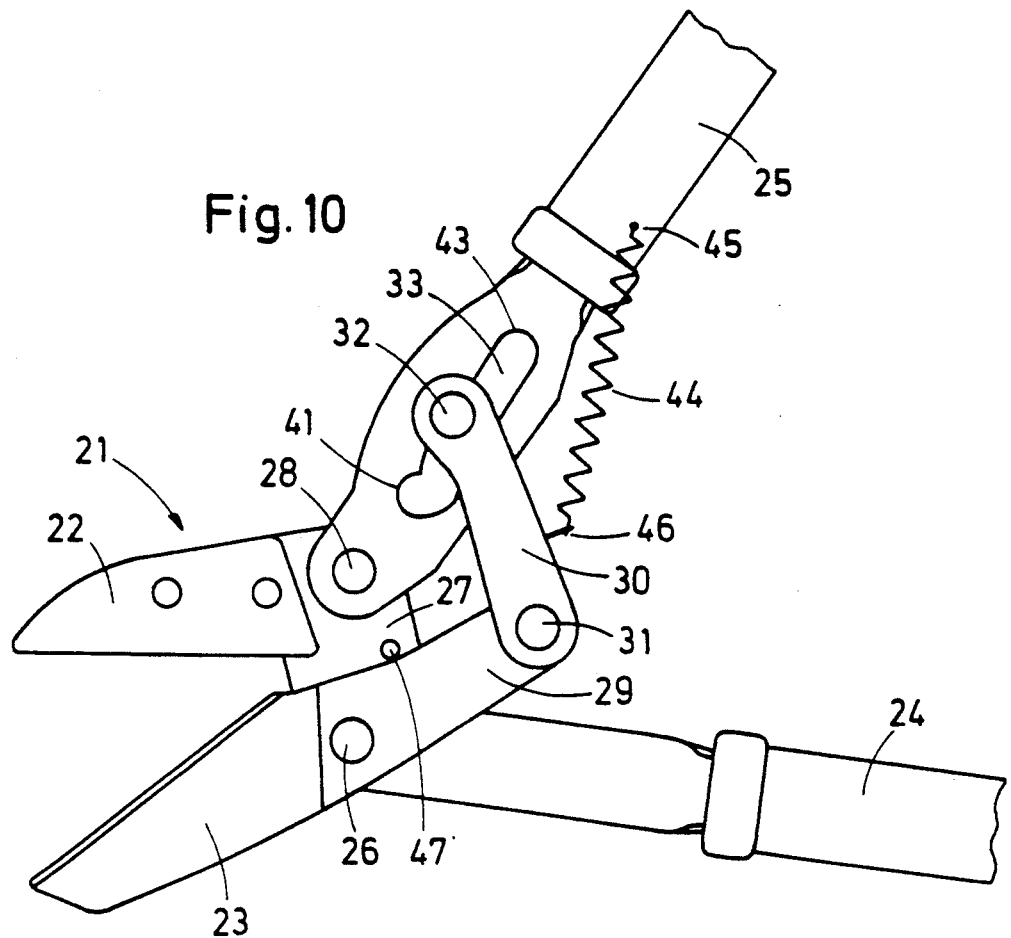

In the position of FIG. 10, there is also automatic locking of the linking axis 32 in the take-up or arresting depression 42 of the slot guide 33. It can be seen in FIG. 10 that there also the attachment points 45 and 46 for the tension spring 44 lie on a straight line with the linking axis 31 between the coupler 30 and the driving arm 29 for the shearing blade 23.

Figure 13:
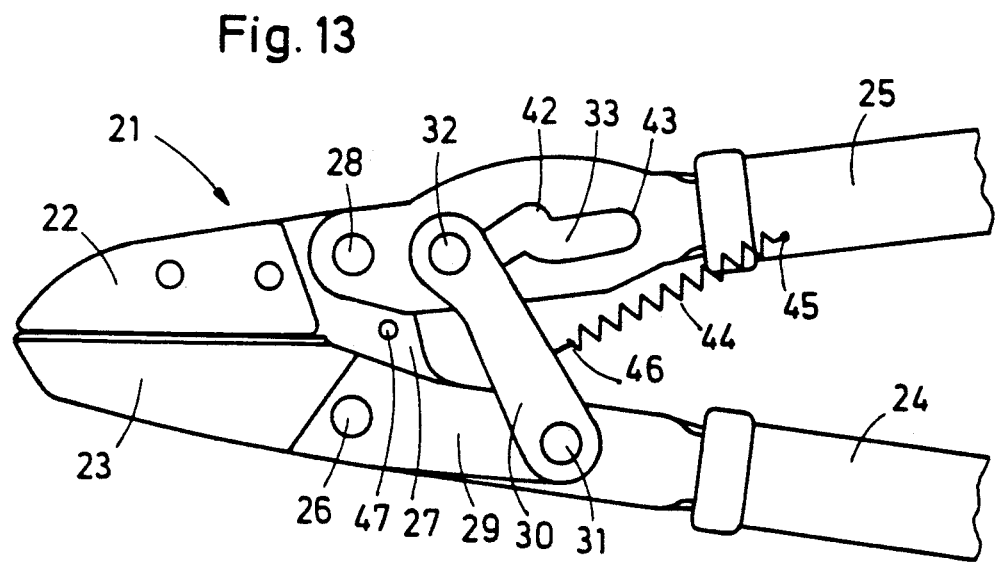

If a cut is carried out with the hand shears 21 being adjusted for the largest transmission ratio as shown in FIG. 12, then the hand shears assume the closed position corresponding to that of FIG. 13. A subsequent opening of the hand shears 21 as far as the position corresponding to that of FIG. 9 causes these shears to adjust themselves automatically again, under the action of the tension spring 44 to the setting for the smallest transmission ratio at which the coupler 30 with its linking axis 32 has moved into the take-up or arresting depression 43.

To set the two other possible transmission ratios subsequently once again then merely requires that the different opening widths between the hand levers 24 and 25, as shown in FIGS. 10 and 12, be set once again.

While specific embodiments of the invention have been shown and described in detail to illustrate the application of the inventive principles, it will be understood that the invention may be embodied otherwise without departing from such principles.

What is claimed is:

1. Hand shears, comprising first and second cutting elements pivotable about a first joint, first and second hand levers joined to one another directly independently of said cutting elements by means of a second joint offset parallel to said first joint, said first cutting element being connected rigidly with said first hand lever, said second cutting element having a driving arm extending beyond said first point, a coupler element hinged at one end to said driving arm and linked at a linking axis at its other end, so as to be freely movable with respect to said second hand lever, said first and second hand levers and said first and second cutting elements forming a four-joint system with one another in which at least the distance between the linking axis and said second joint is variable, means for fixing said linking axis (12) of the coupler element (10) at said second hand lever (5) at a plurality of positions differently spaced from said second joint (8) to effect variable power transmission, said means for fixing said linking axis being permanently attached to said second hand lever and being undetachable from said second hand lever, said means for fixing further comprising in said second hand lever (5) a slot guide (13) engaging said linking axis (12) of said coupler (10), and a slide (14) linked to said linking axis (12) for adjustably supporting said linking axis along said slot guide.

2. The hand shears of claim 1, wherein an operating handle (14) is connected to said second hand lever, said locking means being connected to said slide at said operating handle.

3. The hand shears of claim 1, wherein said second hand lever (5) comprises at least along a part of its length a tubular member which accommodates a substantial portion of the length of said slide (14).

4. The hand shears of claim 1, wherein said fixing means (17') comprises first and second mutually engaging threaded couplings (18', 19'), the first of which (19') engages said slide (14) and the second threaded coupling (18') has an abutment (20') on said second hand over (5).

5. The hand shears of claim 4, further comprising means for mounting the second threaded coupling (18') such that it can rotate but cannot be displaced at the free end of said second hand lever (5).

6. The hand shears of claim 1, wherein said second hand lever (5) has a longitudinal direction, and said fixing means comprise an arresting element (18) which engages said slide (14), an arresting link (19) which extends in the longitudinal direction of said second hand lever (5) and contains a plurality of arresting (20) catches for said arresting element (18), said catches being disposed some distance apart, one behind the other.

7. The hand shears of claim 6, wherein the arresting element (18) comprises a push-button actuation (17") and a spring (14') which engages the actuator to hold it in an arresting catch.

8. The hand shears of claim 1, wherein said slot guide (33) in said second hand lever (25) comprises arresting depressions (41, 42, 43) for the linking axis (32) of said coupler element (30), said depressions being located at least in the edge of said slot guide (33) remote from said first hand lever (24).

9. The hand shears of claim 8, wherein said slot guide (33) has two limiting edges, and said arresting depressions (41, 42, 43) ar located in approximately mutually equidistant spacing between the limiting edges of said slot guide (33).

10. The hand shears of claim 8, wherein one of said arresting depressions (41 and 43) is disposed at either end of said slot guide (33) and another of said arresting depressions (42) is disposed about halfway along said slot guide (33).

11. Hand shears, comprising first and second cutting elements pivotable about a first joint, first and second hand levers joined to one another directly independently of said cutting elements by means of a second joint offset parallel to said first joint, said first cutting element being connected rigidly with said first hand lever, said second cutting element having a driving arm extending beyond said first joint, a coupler element hinged at one end to said driving arm and linked at a linking axis at its other end, so as to be freely movable with respect to said second hand lever, said first and second hand levers and said first and second cutting elements forming a four-joint system with one another in which at least the distance between the linking axis and said second joint is variable, means for fixing said linking axis (32) of the coupler element (30) at said second hand lever (25) at a plurality of positions differently spaced from said second joint (28) to effect variable power transmission, said means for fixing said linking axis being permanently attached to said second hand lever and being undetachable from said second hand lever, a spring element (44) engaging said coupler element (30) at a location between said hinged one end and said linking axis (31 and 32) of said coupler element (30), said spring element biasing the coupler element away from said second joint (28), said angle formed between said cutting elements (22 and 23) when the shears are opened being limited by a stationary stop (47) on said first hand lever (24).

12. The hand shears of claim 11, wherein said spring element comprises a tension spring (44) having one end (46) which engages said coupler element (30), and having its other end anchored (45) on said second hand lever (25).

13. The hand shears of claim 12, wherein said one end (46) of said tension spring (44) on said coupler element (30) is at a greater distance from said linking axis (32) engaging said slot guide (33) than from the hinging axis (31) on said driving arm (29) of said second cutting element (23).

14. Hand shears, comprising first and second cutting elements pivotable about a first joint, first and second hand levers joined to one another directly independently of said cutting elements by means of a second joint offset parallel to said first joint, said first cutting element being connected rigidly with said first hand lever, said second cutting element having a driving arm extending beyond said first joint, a coupler element hinged at one end to said driving arm and linked at a linking axis at its other end, so as to be freely movable with respect to said second hand lever, said first and second hand levers and said first and second cutting elements forming a four-joint system with one another in which at least the distance between the linking axis and said second joint is variable, means for fixing said linking axis (12) of the coupler element (10) at said second hand lever (5) at a plurality of positions differently spaced from said second joint (8) to effect variable power transmission, said means for fixing said linking axis being permanently attached to said second hand lever and being undetachable from said second hand lever, the means for fixing comprising a slide slidingly mounted on said second hand lever and means on said second hand lever for locking the slide to said second hand lever at any of its different positions.

* * * * *